United States Patent [19]

Sougawa

[11] Patent Number: 4,969,433
[45] Date of Patent: Nov. 13, 1990

[54] PISTON FOR INTERNAL COMBUSTION ENGINE

[75] Inventor: Masafumi Sougawa, Hamamatsu, Japan

[73] Assignee: Sanshin Kogyo Kabushiki Kaisha, Hamamatsu, Japan

[21] Appl. No.: 390,660

[22] Filed: Aug. 7, 1989

[30] Foreign Application Priority Data

Aug. 8, 1988 [JP] Japan .................................. 63-196150

[51] Int. Cl.⁵ .............................................. F02F 3/00
[52] U.S. Cl. ................................... 123/193 P; 92/186
[58] Field of Search ............... 92/186, 190; 123/193 P

[56] References Cited

U.S. PATENT DOCUMENTS

| 2,742,883 | 4/1956 | Smith | 92/186 |
|---|---|---|---|
| 3,204,617 | 9/1963 | Hulbert | 92/186 |
| 3,613,521 | 10/1971 | Itano | 92/186 |
| 4,011,797 | 3/1977 | Cornet | 92/186 |
| 4,013,057 | 3/1977 | Guenther | 92/190 |
| 4,026,197 | 5/1977 | Lapke et al. | 92/186 |
| 4,129,108 | 12/1978 | Elsbett et al. | 123/193 P |
| 4,342,291 | 8/1982 | Lewis | 123/193 P |
| 4,517,930 | 5/1985 | Nakano et al. | 92/186 |
| 4,644,853 | 2/1987 | Russell et al. | 92/190 |

Primary Examiner—Andrew M. Dolinar
Assistant Examiner—M. Macy
Attorney, Agent, or Firm—Ernest A. Beutler

[57] ABSTRACT

A piston for a reciprocating machine such as an internal combustion engine that has a pair of piston pin bosses that are defined by parallel surfaces that are adapted to engage and confine a connecting rod therebetween. Lubricant recesses are formed in the bosses and extend from the bore to an area where they can receive lubricant. The recesses are such that the bearing surfaces of the bosses subtends an arc greater than 180°.

5 Claims, 3 Drawing Sheets

PISTON FOR INTERNAL COMBUSTION ENGINE

BACKGROUND OF THE INVENTION

This invention relates to a piston for a reciprocating machine such as an internal combustion engine and more particularly to an improved piston construction.

As is well known, reciprocating machines incorporate a piston that has a pivotal connection to a device such as a connecting rod for transmitting motion between the piston and a crankshaft. Normally, the pivotal connection is provided by a piston pin that is journaled within a pair of aligned piston pin bosses formed in the piston and a corresponding bore formed in the upper or small end of the connecting rod. Generally, the piston pin bosses are defined by facing surfaces between which parallel side faces of the connecting rod are positioned. Frequently, these surfaces are relieved by forming a cut in the surfaces so as to insure that lubricant will be delivered from the machine to the piston pin.

FIGS. 1 and 2 show a conventional prior art piston construction of this type. As may be seen in these figures, a piston 11 is formed with a dome or head portion 12 from which depends a shirt portion 13. A pair of piston pin bosses 14 are formed internally of the piston 11 and define aligned piston pin receiving bores 15. A connecting rod (not shown) has its small end extending between parallel side surfaces 16 of the piston pin bosses 14 and is connected to the piston by means of a piston pin (not shown) that extends through the bores 15 and a corresponding bore in the small end of the connecting rod.

In order to lubricate the bearing surfaces between the piston pin and the piston bores 15 and also the bore in the connecting rod, it is the practice to provide a relief 17 in the boss surfaces 16 so that lubricant which is present in the area can impinge upon the piston pin and lubricate the aforenoted surfaces. Conventionally, the relief 17 is provided by cutting the boss surface 16 about an angularly disposed line at a point extending from approximately the midpoint of the bore 15. As a result, the remaining bearing surface, indicated by the reference numeral 18, subtends no more than 180° of the arc and this means that the bearing area is substantially reduced.

Because of the reduced area, there is a likelihood both of piston cocking and of greater than normal wear occurring. This problem is particularly prevalent where the engine is operating with its output shaft rotating about a substantially vertically extending axis, as is the practice in conjunction with many applications such as in outboard motors or the like.

It is, therefore, a principal object of this invention to provide an improved piston construction for a reciprocating machine wherein wear will be minimized and stability improved without sacrificing the lubrication of the components of the engine.

It is a further object of this invention to provide an improved boss costruction for a piston wherein the boss provides a large bearing area with the connecting rod or the like and wherein sufficient lubricant passages are nevertheless provided.

SUMMARY OF THE INVENTION

This invention is adapted to be embodied in a piston construction for a reciprocating machine which piston comprises a pair of spaced apart pin bosses that are adapted to receive a connecting rod or the like therebetween. A pair of aligned piston pin bores are formed in the pin bosses for receiving a piston pin to connect the piston to the connecting rod or the like. The pin bosses are defined by a pair of parallel faces that are adapted to confine the connecting rod or the like therebetween. These faces have oil reliefs formed therein which extend from a portion of the piston pin bores to an area where lubricant will reside for delivering lubricant to the piston pin and piston pin bores. The groove is configured so that the parallel faces define bearing areas that are adapted to contact the connecting rod around greater than 180°.

DETAILED DESCRIPTION OF THE PREFERRED EMBODIMENTS OF THE INVENTION

Figure 1:
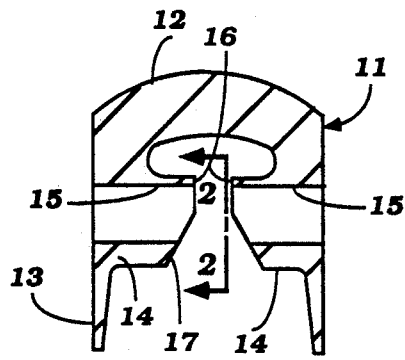
FIG. 1 is a cross-sectional view taken through a piston constructed in accordance with the prior art.
Figure 2:
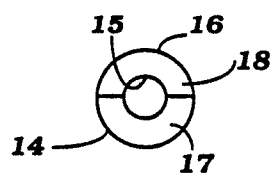
FIG. 2 is a view looking in the direction of the line 2—2 in FIG. 1.
Figure 3:
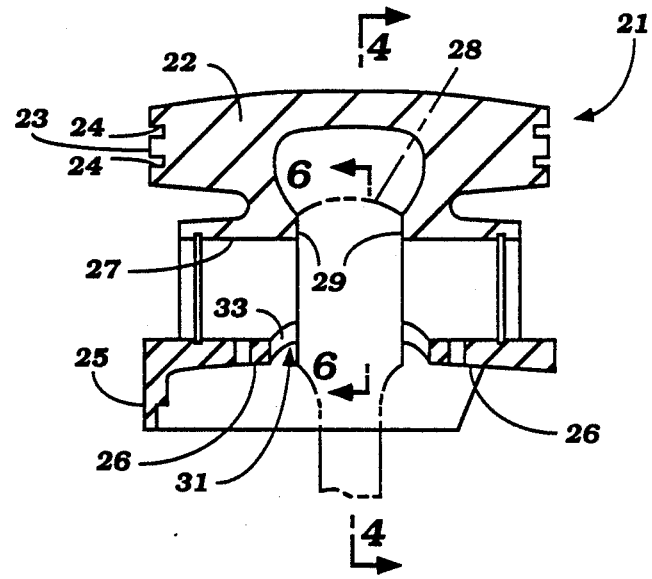
FIG. 3 is a cross-sectional view taken through a piston constructed in accordance with an embodiment of the invention.
Figure 4:
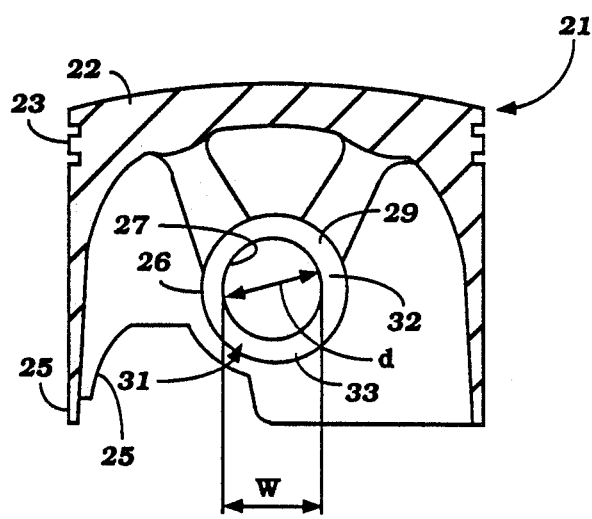
FIG. 4 is a cross-sectional view taken along the line 4—4 of FIG. 3.

Referring in detail to FIGS. 3 through 6, a piston for a reciprocating machine such as an internal combustion engine constructed in accordance with an embodiment of the invention is identified generally by the reeference numeral 21. The piston 21 may be formed either as a casting or a forging and preferably as formed from a lightweight material such as aluminum. The piston 21 has a piston head 22 that is surrounded by a piston ring land area 23 in which one or more piston ring receiving grooves 24 are formed. A skirt portion 25 depends from the land area 23 and may be formed with porting reliefs 25 if the piston 21 utilized in conjunction with a two cycle crankcase compression internal combustion engine.

A pair of piston pin bosses 26 are formed internally of the piston 21 in the area below the head portion 22. The piston pin bosses 26 have aligned piston pin receiving bores 27 that are adapted to receive a piston pin (not shown) for connection to a connecting rod 28 or the like which is shown in phantom in FIG. 3. Rather than providing a connection to a connecting rod 28, the piston pin may provide a connection to some other form of mechanism such as a scotch yoke or the like for transmitting motion between the reciprocation of the piston 21 rotation of an associated crankshaft (not shown).

The piston pin bosses 26 have facing parallel surfaces 29 that are adapted to face the opposite parallel surfaces of the small end of the connecting rod 28 so as to confine the movement of the connecting rod 28 relative to the piston 21 in a transverse direction.

When the machine operates so that the crankshaft rotates about a vertically extending axis, the connecting rod 28 will be in light rubbing contact with one of the surfaces 29 at all times.

In accordance with the invention, surfaces 29 of the bosses 26 are provided with oil reliefs 31 that extend from the lower surface of the piston 21 to the bores 27 so as to deliver lubricant to the piston pin for its lubrication and the lubrication of the bearing surfaces of the piston pin bosses 26. Unlike the prior art, however, the oil reliefs 31 are formed so that they will still permit a resulting bearing area 32 of the piston pin bosses to engage the opposite surfaces of the connecting rod small end through greater than 180° around the circumference. Basically, in the illustrated embodiment, the recesses 31 are formed by a recessed surface 33 which may, in one embodiment of the invention, have a generally arcuate configuration as would be formed by an end mill cutter 34 as shown in phantom in FIG. 5. The width W of the recess 31 is, in this embodiment, no greater than the diameter d of the piston pin bore 27. As a result, it will be seen that the bearing area 32 subtends greater than a 180° arc.

Figure 5:
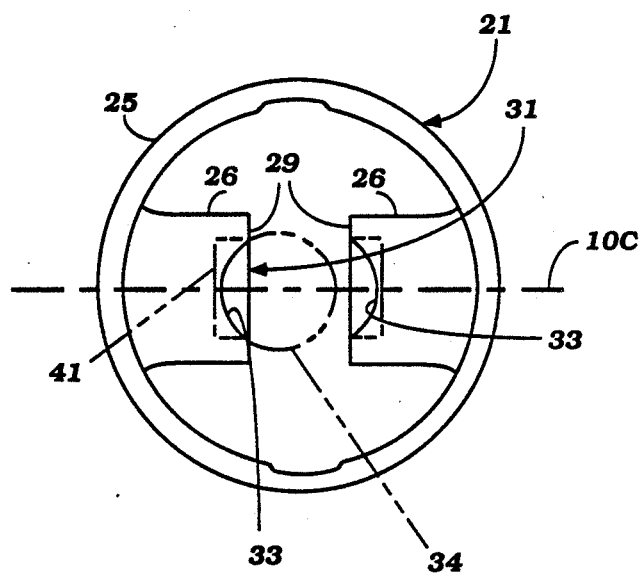
FIG. 5 is a bottom plan view of the piston.
Figure 6:
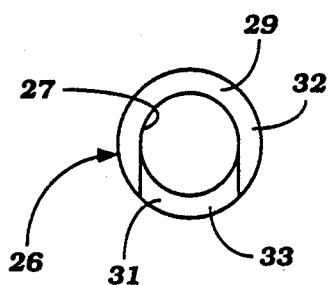
FIG. 6 is a view looking in the direction of the line 6—6 of FIG. 3.

Rather than forming the recess 31 as a curved surface, it can be formed as a rectangular cutout as shown by the phantom line 41 in FIG. 5. Alternatively, other configurations are possible so long as the bearing surface between the piston pin boss surfaces 29 and the connecting rod subtend an arc greater than 180°. Preferably, the width W of any recess should not exceed the diameter d of the piston pin bore 27, although portions of the groove may exceed this width.

It should be understood that the foregoing is a description of preferred embodiments of the invention and that various changes and modifications may be made without departing from the spirit and scope of the invention, as defined by the appended claims.

I claim:

1. A piston construction for a reciprocating machine comprising a pair of spaced apart pin bosses adapted to receive a connecting rod therebetween, a pair of aligned piston pin bores formed in said pin bosses for receiving a piston pin to connect said piston to the connecting rod, said pin bosses being defined by a pair of parallel faces adapted to confine the connecting rod therebetween, said faces having oil reliefs formed therein extending from a portion of said piston pin bores to an area where lubricant will reside for delivering lubricant to the piston pin and said piston pin bores, said oil reliefs being configured so that said parallel faces define a bearing area that extends circumferentially greater than 180° around the piston pin.

2. A piston construction as set forth in claim 1 wherein the oil reliefs is defined by a pair of generally extending parallel side faces having a width not greater than the diameter of the piston pin bore.

3. A piston construction as set forth in claim 2 wherein the oil reliefs is formed by an arc having a center extending parallel to the surfaces.

4. A piston construction as set forth in claim 2 wherein the oil reliefs are rectangular in cross-section.

5. A piston construction as set forth in claim 1 wherein the oil reliefs are defined by a pair of sides that have a distance between them no greater than the diameter of the piston pin bore.

* * * * *